Oct. 2, 1962  R. NOWAK  3,056,657
METHOD FOR RECOVERY OF PURE AMMONIA FROM COKE-OVEN GASES
Filed Sept. 28, 1960
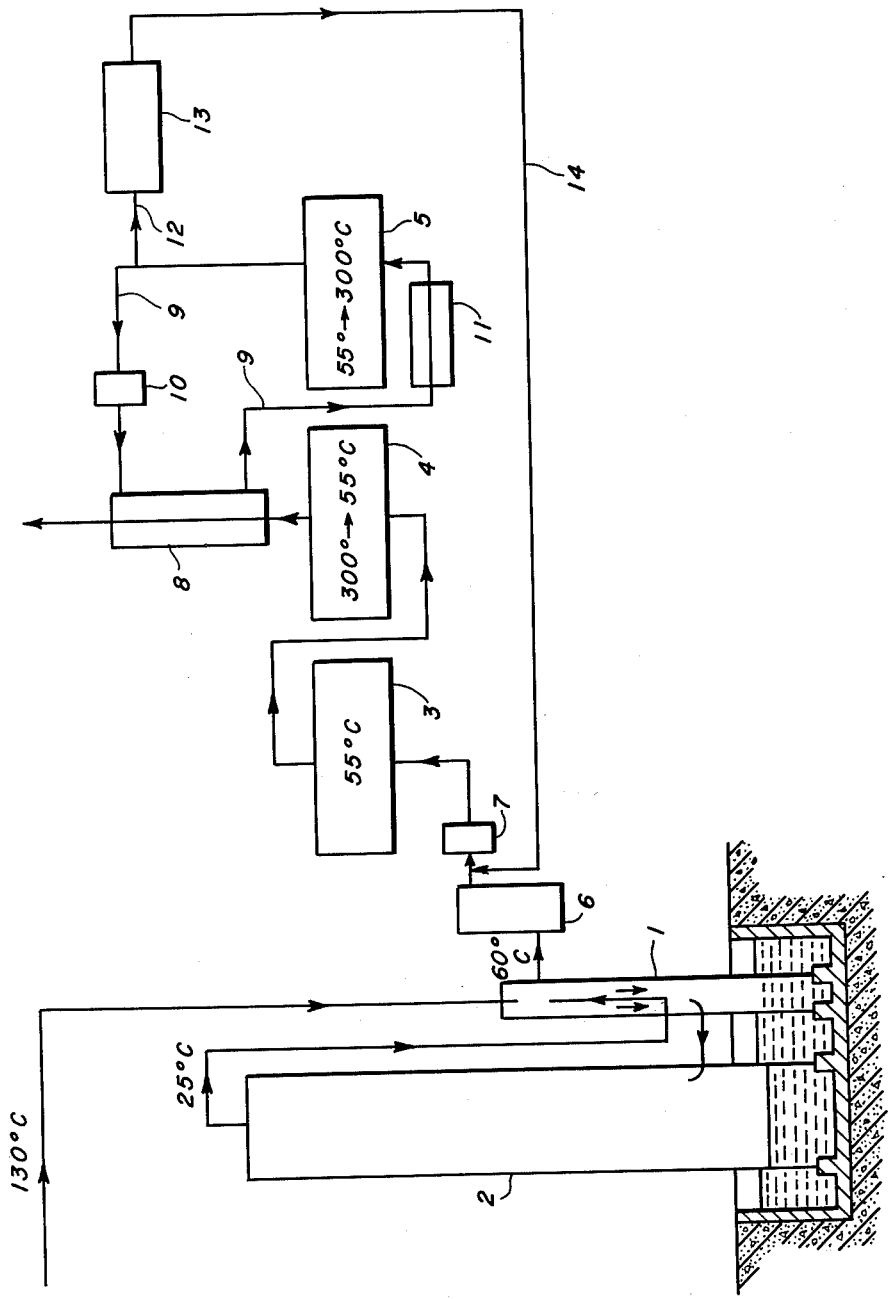
INVENTOR.
RUDOLF NOWAK
By Donald G. Dalton
Attorney

United States Patent Office 3,056,657
Patented Oct. 2, 1962

3,056,657
METHOD FOR RECOVERY OF PURE AMMONIA FROM COKE-OVEN GASES
Rudolf Nowak, Frankfurt am Main, Germany, assignor to United States Steel Corporation, a corporation of New Jersey
Filed Sept. 28, 1960, Ser. No. 59,107
3 Claims. (Cl. 23—196)

The present invention relates to a method for the separation and recovery of ammonia from coke-oven gases by adsorption and desorption of gases.

Several methods are known for separation and recovery of ammonia from its mixtures in which the gas is absorbed in liquid and then desorbed, but all of them have certain objectionable features. Because of unfavorable equilibrium conditions involving the distribution of ammonia and other gases, such as $H_2S$ and $HCN$, between the liquid and gas phases, absorption and desorption have to be repeated several times for complete removal of the ammonia from the gas. Desorption is accomplished principally by the use of vacuum. These processes are complicated and, in addition, on account of the high specific heats of liquids, are uneconomical from the thermal standpoint. Other methods are known, in which ammonia-containing gases are washed with acid solutions. In this case, large amounts of ammonium salts are formed from which pure ammonia can be recovered only with great difficulty.

When it has been attempted to obtain ammonia from coke-oven gas and similar mixtures by adsorption and desorption activated charcoal was used as an adsorbent, but it was found that the amount of ammonia absorbed per kilogram of charcoal was so small that the heat required for its desorption was excessive when viewed from the economic standpoint. In addition, the selective action of the activated charcoal was poor because, together with ammonia, it adsorbed large amounts of hydrocyanic acid and hydrogen sulphide. Silica gels on the other hand, when used in the presently known processes, absorbed much ammonia and little HCN and $H_2S$, but large amounts of water. In this case an uneconomical heat consumption was required to evaporate water. Impracticability of these adsorption-desorption processes is further markedly intensified by the clogging of the pores of the adsorber medium with organic matter and polymerization products. Formation of the latter is caused mainly by hydrocyanic acid which, as is well known, very easily polymerizes in neutral or alkaline media to dark-brown viscous substances.

The present invention has for its object the economical recovery of pure ammonia from raw coke-oven gases through an adsorption-desorption process, in which water adsorption and clogging of the pores of the absorbent medium are greatly reduced.

It has been found that silica gels adsorb small amounts of water and large amounts of ammonia from coke-oven gas when the adsorption treatment is conducted at temperatures substantially above the dew point of the coke-oven gas. The higher the adsorption temperature is above the dew point, the less water will be adsorbed by the silica gel. According to the invention, in order to prevent contamination of the silica gel with tar, the hot gas coming from the coke ovens is first cooled to a temperature low enough to condense the major part of the tar. On such cooling, a portion of steam present in the raw gas also condenses which involves the loss of a portion of its ammonia by solution in the condensed water. The lower the temperature to which the gases are cooled, the lower will be the moisture concentration and ammonia content of the cooled gas. A higher condensing temperature results in a higher steam and ammonia content of the cooled raw gas. A marked increase in ammonia production is obtained when the raw gas is cooled to about 40° C., freed from condensates, heated above 40° C., and the ammonia is then adsorbed at this temperature or at around 80° C. The raw gas may, however, be cooled to 20° C., and the adsorption conducted at 40° C. In the first case, more ammonia will be recovered but, on account of the higher temperature of adsorption, less ammonia per unit weight of silica gel is adsorbed. In the second, the ammonia content of the raw gas is lower, but substantially more ammonia is adsorbed by each unit weight of the gel on account of the lower temperature. From the production standpoint, the optimum conditions are reached with a condensation temperature of about 30° C. and an adsorption temperature of about 60° C.

The desorption of ammonia-charged silica gel is best accomplished at about 300° C. At this temperature, all ammonia is driven from the gel without requiring contact thereof with a stripping gas. This has the advantage of avoiding dilution of the gaseous desorption products, which increases their value. At about 300° C., the desorption products are in gaseous state and consist of $NH_3$, $H_2O$, $C_6H_6$, $C_{10}H_8$, $CO_2$, $H_2S$ and $HCN$. These gases are first conducted over quicklime (CaO) which removes from the gaseous mixture $H_2O$, $CO_2$, $H_2S$ and $HCN$. Finally gaseous ammonia is separated from the remaining benzol vapors by fractional condensation.

It has been found, furthermore, that the clogging of the pores of silica gel by organic polymerization products from coke-oven gases can be avoided by using silica gel charged with boric acid. The selective adsorption depends very much on the pore dimensions of the adsorbing medium. There are available silica gels with large, medium and small pores. With a particle size of 1.5 to 3 mm. diameter, silica gels have about the following bulk weights:

|  | Kilograms/liter |
|---|---|
| Large-pore silica gel | 0.44 |
| Medium-pore silica gel | 0.53 |
| Small-pore silica gel | 0.71 |

Silica gel charged with boric acid, having a pore size between that of large-pore and medium-pore silica gel, a bulk weight of 0.52 kilogram/liter and a particle size between 1.5 and 3.0 mm. diameter, adsorbs from the raw coke-oven gas most of the ammonia, a little water and benzol, and only traces of $CO_2$, HCN and $H_2S$.

It has been finally found that the amount of ammonia adsorbed by one unit weight of silica gel depends on the velocity of the raw gas between particles of the gel in the gel layer. At all gas velocities lower than 80 centimeters per second, silica gel adsorbs a constant amount of ammonia. When velocities are greater than 80 centimeters per second, substantially less ammonia is adsorbed by the gel. Maintenance of gas velocity of 80 cm./sec. leads to the most efficient utilization of the silica gel since, at this speed, a maximum of ammonia is adsorbed in a minimum time.

In the drawing, is shown diagrammatically a typical installation for the utilization of the method according to the invention. A complete understanding of the latter may be obtained from the following detailed explanation and description.

The hot raw gas from the coke ovens flows at a temperature of about 130° C. through a heat exchanger 1 into a cooling tower 2, in which it is cooled to about 25° C. in order to precipitate tar and water. From cooling tower 2, the gas is returned to heat exchanger 1 and is warmed there to a temperature of about 60° C.

The three adsorbers 3, 4 and 5 each contain a 1-meter thick silica-gel layer. At a given time, adsorber 3 is being cooled to a temperature of about 55° C. for adsorption. Adsorber 4 is undergoing desorption at a temperature of about 300° C. Adsorber 5 is actively adsorbing at a temperature of about 55° C. In the next stage of operation, adsorber 3 will be placed in active operation, adsorber 4 will be cooled from 300 to 55° C. for adsorption, and adsorber 5 will be heated to 300° C. preparatory to desorption.

The raw gas is drawn from heat exchanger 1 at a temperature of 60° C., through an electrostatic precipitator 6, by a compressor 7 and is then sent through adsorbers 3 and 4 leaving the installation through a heat exchanger 8. In adsorber 3, the gas gives up all ammonia, a portion of its steam, benzol, naphthalene and hydrogen sulphide. Adsorber 4 is cooled by the gas from 300 to 55° C. The gas is heated thereby and yields a portion of its heat in heat exchanger 8 to the desorption circuit 9.

The desorption circuit 9 at the beginning is filled with pure coke-oven gas, in the same way as the whole installation. In later stages it contains almost exclusively the gaseous desorption products, namely $NH_3$, $H_2O$, benzol, etc. A compressor 10 forces the gases through the circuit including a heat exchanger 8, a superheater 11 and adsorber 5. The gases are preheated in heat exchanger 8 and then brought to 300° C., when so required, in superheater 11. This superheater can be heated by cheap waste heat or with blast-furnace gas, generator gas or with coke-oven gas.

During desorption, gases and vapors are set free in adsorber 5 and flow through pipe 12 to a separating plant 13. Here, water vapor, $CO_2$, HCN and $H_2S$ are combined with quicklime (CaO) and benzol, naphthalene and ammonia are separated in the conventional manner by fractional condensation and cooling under pressure, after which they are liquified. Small amounts of the residual coke-oven gas are returned through pipe 14 to the main stream of the raw gas.

Technical data for a typical example of operations as described above are:

| | |
|---|---|
| Silica gel | Medium to large pores; charged with boric acid; particle size 1.5 to 3 mm. diameter; bulk weight 0.52 kg./l. |
| Cooling temperature of raw gas | 25° C. |
| Adsorption temperature | 55° C. |
| Desorption temperature | 300° C. |
| Gas velocity during adsorption between gel particles | 80 cm./sec. |
| One gram of silica gel adsorbed from the raw gas containing 7 grams $NH_3$/m.³ | 16.2 mg. $NH_3$; 14.9 mg. $H_2O$; 12.9 mg. $C_6H_6$; 3.10 mg. $C_{10}H_8$; 0.3 mg. $CO_2$; 0.2 mg. $H_2S$; 0.1 mg. HCN. |
| Amount of raw gas | 100,000 m.³/hr. |
| Diameter of an adsorber | 15.6 meters. |
| Thickness of silica gel layer | 1 meter. |
| Weight of silica gel in each adsorber | 100 tons. |
| Time of adsorption before the appearance of ammonia at outlet | 2⅓ hours. |
| CaO consumption | 2.1 tons. |
| Recovery of slaked lime (as CaO) | 2.4 tons. |
| Ammonia recovered | 700 kilograms. |
| Benzol recovered | 527 kilograms. |
| Naphthalene recovered | 134 kilograms. |

The adsorbers and piping are thermally insulated. The three adsorbers work in succession. In each adsorber, the adsorption, desorption and cooling steps take place one after the other.

In addition to the advantages already mentioned, it will be evident from the foregoing that the invention affords a simple, efficient method of recovering ammonia at low cost. The apparatus involved, furthermore, is of known type, reliable in operation and easy to maintain.

Although I have disclosed herein the preferred embodiment of my invention, I intend to cover as well any change or modification therein which may be made without departing from the spirit and scope of the invention.

I claim:

1. A method for recovering pure ammonia from raw coke-oven gas containing $H_2O$, $CO_2$, $H_2S$ and HCN in addition to ammonia, by adsorption in silica gel and desorption therefrom, which consists in cooling raw coke-oven gases to a temperature from 20° C. to 40° C., separating condensed liquids from the gas, heating the gas to a temperature of from 20° C. to 40° C. above the condensing temperature, passing the gas at the last-mentioned temperature through silica gel charged with boric acid having a bulk density of from .44 to .53 kilogram per liter, and on saturation of the silica gel with ammonia, desorbing it therefrom by heating the gel to a temperature of about 300° C.

2. A method according to claim 1, characterized by separating $H_2O$, $CO_2$, $H_2S$ and HCN from the gaseous desorption products with burnt lime and recovering benzol and ammonia from the remainder by fractional condensation.

3. A method according to claim 1, characterized by the velocity of the raw gas in contact with silica gel being about 80 centimeters per second.

References Cited in the file of this patent

UNITED STATES PATENTS

| | | |
|---|---|---|
| 862,976 | Koppers | Aug. 13, 1907 |
| 1,453,215 | Voress et al. | Apr. 24, 1923 |